(12) United States Patent  
Yamada et al.

(10) Patent No.: US 6,689,511 B2  
(45) Date of Patent: Feb. 10, 2004

(54) SECONDARY BATTERY AND ELECTRONIC INSTRUMENT USING IT

(75) Inventors: Kazuo Yamada, Kitakatsuragi-gun (JP); Takehito Mitate, Yamatotakada (JP); Motoaki Nishijima, Gose (JP)

(73) Assignee: Sharp Kabushiki Kaisha, Osaka (JP)

( * ) Notice: Subject to any disclaimer, the term of this patent is extended or adjusted under 35 U.S.C. 154(b) by 169 days.

(21) Appl. No.: 09/732,898

(22) Filed: Dec. 11, 2000

(65) Prior Publication Data

US 2001/0005561 A1 Jun. 28, 2001

(30) Foreign Application Priority Data

Dec. 9, 1999 (JP) .......................................... 11-350270

(51) Int. Cl.[7] ................................................ H01M 2/08
(52) U.S. Cl. ........................ 429/175; 429/163; 429/167; 429/185
(58) Field of Search ................................ 429/163, 167, 429/175, 185

(56) References Cited

U.S. PATENT DOCUMENTS 5,478,668 A * 12/1995 Gozdz et al. ................ 429/127
6,268,087 B1 * 7/2001 Kim et al. ................... 429/129
6,399,241 B1 * 6/2002 Hara et al. ................... 429/124

* cited by examiner

*Primary Examiner*—Patrick Ryan  
*Assistant Examiner*—Dah-Wei D. Yuan  
(74) *Attorney, Agent, or Firm*—Nixon & Vanderhye P.C.

(57) ABSTRACT

A secondary battery comprising a battery main body composed of at least one battery element and an external packaging film, the battery element including an electrolyte as well as a positive electrode layer and a negative electrode layer holding the electrolyte therebetween, the external packaging film closely contacting and sealing the battery element, wherein the external packaging film sealing the battery element has, at a surface thereof, a difference in level according to a contour of the battery element.

11 Claims, 3 Drawing Sheets

SECONDARY BATTERY AND ELECTRONIC INSTRUMENT USING IT

CROSS-REFERENCE TO RELATED APPLICATION

This application is related to Japanese Patent Application No. Hei 11(1999)-350270 filed in Dec. 9, 1999, whose priority is claimed under 35 USC §119, the disclosure of which is incorporated by reference in its entirety.

BACKGROUND OF THE INVENTION

1. Field of the Invention

The present invention relates to a secondary battery and an electronic instrument using it, and more specifically to a secondary battery composed of battery element and an external packaging film sealing the battery element by adhering thereto and also to an electronic instrument using it.

2. Description of the Related Art

By the propagation of lithium ion batteries or the like, small-sizing and light-weighting of a battery as the electric source of portable type electronic instruments such as a portable telephone, etc., have rapidly progressed. However, the requirement of more small-sizing and thinning of electronic instruments is strong, and more small-sizing and thinning of batteries have been demanded. In such a circumstance, small-sizing and thinning of various electronic parts have been attempted, at present, the size of a battery becomes an essential factor of determining the size or the thinness of electronic instruments, and many efforts have been made for thinning and light-weighting of batteries.

For thinning electronic instruments, it is preferred to mount a battery having as small a thickness as possible. For determining the position of the battery in the instrument needs to be considered according to an inside configuration of the instrument. That is, in a thin battery, a sufficient capacity is not obtained, whereby the using time is restrained, and when a thick battery is used for obtaining a sufficient capacity, thinning of electronic instrument becomes difficult.

Thus, in the stage of circuit designing, an effort of insuring a wide space having a uniform thickness by gathering parts having a high height at one portion has been made but in such a case, it is unavoidable that the degree of freedom of circuit designing is spoiled.

In such circumstances, thinning of a secondary battery of portable type electronic instruments has progressed, and recently, can-type secondary batteries having a thickness of 4 mm or thinner have been commercialized and card-type or film-form batteries utilizing laminate pack have been developed, but the above-described problems have not yet been fundamentally solved.

SUMMARY OF THE INVENTION

The present invention has been made in view of the above-described problems, and an object of the invention is to provide a secondary battery having a sufficient capacity and capable of attaining small-sizing and thinning of electronic instruments without spoiling the degree of freedom of circuit designing and to provide an electronic instrument using the secondary battery.

According to the present invention, there is provided a secondary battery comprising a battery main body composed of at least one battery element and an external packaging film, the battery element including an electrolyte as well as a positive electrode layer and a negative electrode layer holding the electrolyte therebetween, the external packaging film closely contacting and sealing the battery element, wherein the external packaging film sealing the battery element has, at a surface thereof, a difference in level according to a contour of the battery element.

That is, in the case of forming the battery main body of the secondary battery by laminating battery elements each, as the fundamental unit, composed of a positive electrode, an electrolyte, and a negative electrode, by partially changing the laminated layer number of the battery elements, the difference in level fitting to the form of the receiving space of the secondary battery or the form of electronic part group received adjacent to the secondary battery can be formed at the surface of the battery main body, whereby the secondary battery capable of being deformed without being adhered to the restriction of the uniform thickness of a secondary battery of prior art can be provided.

That is, in the secondary battery of the invention, since in the designing stage of an electronic instrument constituted together with an electronic part group, an external packaging case, etc., each of high and low portions can be desirably established at the battery main body. For example, in the case of placing a secondary battery adjacent to an electronic part group received in an external packaging case, a secondary battery having high and low portions absorbing the unevenness of the height of the electronic part group can be prepared or a secondary battery having high and low portions fitting to the space having nonuniform shapes in the above-described external packaging case can be prepared.

Also, according to other view point of the present invention, there is provided a secondary battery wherein constituting members such as circuit portions, etc., constituting an electronic instrument are disposed on the surface of the battery element and they are sealed with an external packaging film, whereby the difference in level is formed between a high portion composed of the surface of the constituting members such as the above-described circuit portions, etc., disposed on the surface of the battery element and a low portion composed of the exposed surface of the battery element, and such a secondary battery is also included in the invention.

As the circuit portions in the invention, protective circuit portions of an electronic instrument are illustrated. In this case, the battery main body may be a battery main body of prior art having a uniform thickness only or the battery main body may be the battery main body having the portions having large and small laminated numbers of the battery elements of the invention.

By the construction as described above, the secondary battery having a sufficient capacity can be mounted on an electronic instrument while utilizing in maximum the restricted receiving space.

Since when an adhesive packaging technique which has hitherto been used for sealing a battery element with an external packaging film by adhesion is applied to the present invention, the difference in level according to the above-described high and low portions is formed as it is on the surface of the external packaging film of the battery element, the technique can be applied without obstructing the establishment of the correct difference in level.

Accordingly, the secondary battery having a sufficient capacity and capable of attaining small-sizing and thinning of an electronic instrument can be proposed without spoiling the degree of freedom of circuit designing.

The difference in level is formed by a plurality of planes perpendicular to a direction in which the electrolyte and the positive and negative electrode layers of the battery element are laminated.

"The high portion" in the secondary battery of the invention means "the surface of a thick portion" of the battery element where a relatively large number of layers are laminated, and "the low portion" means "the surface of a thin portion" of the battery element where a relatively small number of layers are laminated.

As the embodiments of the lamination of the battery elements for forming the difference in level at the external packaging surface of the secondary battery of the invention, there are illustrated embodiments such as (1) a small battery element is placed on a large battery element, (2) one battery element is wound, (3) one battery element is folded a little, etc.

As the above-described embodiment (1), there is illustrated an embodiment that the difference in level is formed between a high portion defined by a surface of a second battery element which is laminated on a surface of a first battery element and is smaller than the first battery element and a low portion defined by an exposed surface of the first battery element.

As the above-described embodiment (2), there is illustrated an embodiment that the battery element is wound round, and the difference in level is formed between a high portion defined by a surface of an outside end portion of the battery element and a low portion defined by an exposed surface of the battery element below the outside end portion.

As the above-described embodiment (3), there is illustrated an embodiment that the battery element is folded, and the difference in level is formed between a high portion defined by a surface of an upper end portion of the battery element and a low portion defined by an exposed surface of the battery element below the upper end portion.

In the present invention, the phrase "a low portion defined by an exposed surface of a battery element" means that a low portion is defined by a surface of the battery element or battery main body and that, inside the packaging, the surface is not covered with another battery element, a part of the battery element or battery body itself, or another element of the secondary battery such as a circuit portion.

In the embodiments (1) to (3) described above, there are no particular restrictions on the lamination layer number of the battery elements, the formation number of the high and low portions, the formation positions of the high and low portions, the formation directions (same directions/opposite directions) of the high and low portions, the winding number of the battery element, the folding number or the combination of the folding directions (outer folding/inner folding) of the battery element.

In addition, in the embodiments (2) and (3), by establishing the length of the end portion of the battery element such that the end portion is disposed at the desired position of the electrode surface of the battery element becoming the low portion, the width of the high portion is determined.

"The high portion" in the secondary battery in other view point of the invention means "the surface of a thick portion" of the battery main body containing the circuit portion disposed on the surface of the battery element, and "the low portion" of the battery main body means "the surface of a thin portion" composed of the battery element only without containing the circuit portion.

As the practical embodiment of forming the difference in level on the external packaging surface of the secondary battery of the invention, there is illustrated an embodiment that a protective circuit (circuit portion) of an electronic instrument is disposed on the surface of the battery element.

In the embodiment of the secondary battery containing the above-described circuit portions, there are no particular restrictions on the disposed number, the disposed positions, and the disposed directions (same directions/opposite directions) of the circuit portions.

In addition, the secondary batteries each disposing the above-described circuit portions on the surface of the battery element of the embodiments (1) to (3) described above are also included in the invention.

By adhering the external packaging film in the invention to the battery element by vacuum packaging, the difference in level of the battery element forms the difference in level of the surface of the battery main body as it is. In vacuum packaging, in the case of sealing the battery element with the external packaging film, when the inside is evacuated and the battery element is sealed as it is, the external packaging film is pressed by the atmospheric pressure, by the flexibility of the external packaging film, the external packaging film becomes a concave form towards outside in the corner portion, etc., between the high portion and the low portion of the battery element, and the difference in level is definitely formed at the surface of the battery element while minimizing the gap between the inside surface of the external packaging film and the battery element.

The difference in level of the surface of the battery main body in the invention is the range of from 10 $\mu$m to 2 mm, and preferably from 100 $\mu$m to 1 mm. When a battery main body is not mounted on an instrument by the slight difference of thickness in the designing stage of the instrument, such a level difference of the battery avoid a large designing change of circuit and the space of the instrument is efficiently utilized. When the above described level difference is too large, the energy density of the battery element inserted in the thin portion is lowered, and, on the other hand, when the level difference is too small, the fundamental unit of the battery element cannot be received.

The area ratio of the surfaces of the high portion and the low portion can be properly selected but it is desirable that the area ratio of the area of the thin portion/the area of the thick portion is from 0.5/9.5 to 9.5/0.5, preferably from 0.5/9.5 to 5/5, and more preferably from 0.5/9.5 to 3/7.

Also, it is preferred to insure the battery capacity that the area of the surface of the low portion is kept at a minimum. The form of the boundary forming the difference in level is preferably a straight form which can be easily formed but the form may be a bent line form or a curved line form, and the form can be selected to be the form which is most useful in the case of mounting the battery on an instrument.

As the electrolyte in the invention, it is preferred to use a solid polymer electrolyte. By using a solid polymer electrolyte as the electrolyte in the invention, the safety is increased and even when the external packaging film is a thin external packaging material such as a laminate material, the battery having a high reliability can be obtained.

According to another view point of the present invention, there is provided an electronic instrument comprising the secondary battery of the invention described above, an electronic part group, and an external packaging case, wherein by disposing the high portion and the low portion forming the difference in level of the surface of the external packaging film of the secondary battery to the electronic parts having different heights or the wall surfaces of different heights in the inside of the external packaging case, the secondary battery and the electronic part group are placed in the external packaging case in a dense state.

The electronic instrument in the invention means an electronic instrument constituting one independent electronic apparatus or electric apparatus by combining the secondary battery of the invention described above with an electronic part group, etc., and an electronic instrument constituting a circuit assembly forming at least a part of the circuit portions of an electronic apparatus or an electric apparatus by combining the secondary battery of the invention with an electronic part group, etc.

Since in the electronic instrument of the invention, the degree of freedom for circuit designing is increased and the secondary battery having a sufficient capacity can be mounted by effectively using the space of the electronic instrument, as compared with an electronic instrument of prior art, the thin-type electronic instrument can be prepared without shortening the using time of the electric source. The electronic instrument of the invention include a potable terminal, that is, potable information instrument such as a portable telephone, a notebook personal computer, electronic pocketbook, etc.; a potable-type game device, a card-type computer, a digital camera, etc.

DETAILED DESCRIPTION OF THE INVENTION

Then, the present invention is described in detail.

First, the practical construction embodiments of the secondary battery of the present invention and the electronic instrument using the secondary battery are described by referring to the accompanying drawings.

Figure 1:
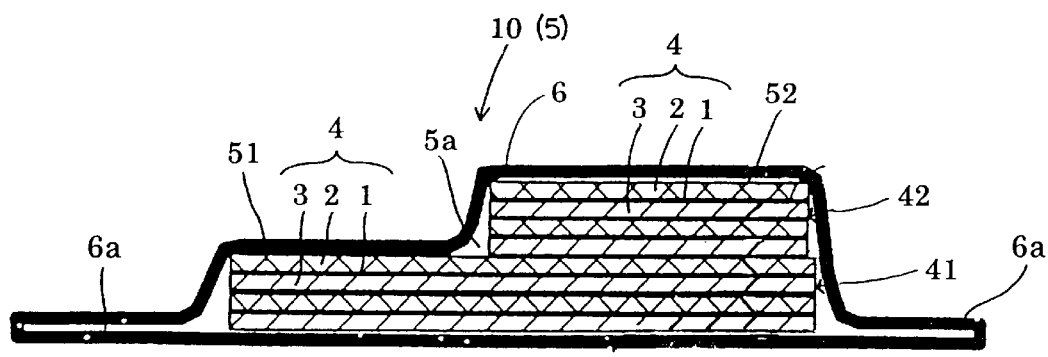
FIG. 1 is a cross sectional view showing an embodiment of the secondary battery of the invention.

In FIG. 1, a secondary battery 10 is provided a battery main body 5 composed of battery elements 4 and an external packaging film 6 sealing the battery element 4. The battery element 4 is provided an electrolyte 1 and a positive electrode 2 and a negative electrode 3 holding the electrolyte 1 between them.

The secondary battery 10 has a high portion 52 composed of the surface of 2nd battery elements 42 smaller than 1st battery elements 41, said 2nd battery elements 42 being laminated on the positive electrode 2 of the 1st battery elements 41, and a low portion 51 composed of the surface of the exposed 1st battery elements 41, and a difference in level 5a is formed between the high portion 52 and the low portion 51.

The low portion 51 is constituted of the lamination layer number [2] only of the battery elements 4 of the 1st battery elements 41, and the high portion 52 is constituted of total lamination layer number [4] of adding the lamination layer number [2] of the battery elements 4 of the 2nd battery elements 42 further onto the low portion 51. The external packaging film 6 is adhered to the battery element 4 by vacuum packaging to seal the battery element 4, and the difference in level 5a appears as it is at the surface of the external packaging film 6. Both ends of the external packaging film 6 become the sealing portion 6a.

Figure 2:
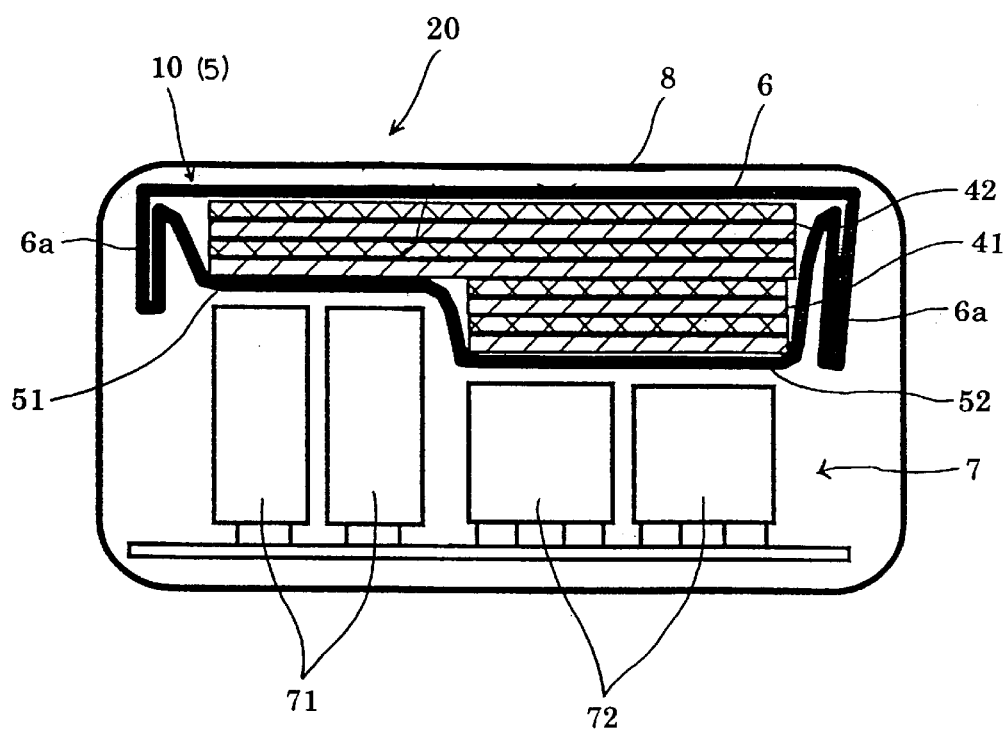
FIG. 2 is a schematic cross sectional view showing an electronic instrument mounted with the secondary battery of FIG. 1.

As shown in FIG. 2, both ends of the external packaging film 6 are bent to form sealing portions 6a and the secondary battery 10 is placed in an external packaging case 8 together with an electronic part group 7 to constitute an electronic instrument 20.

In the external packaging case 8, the secondary battery 10 and the electronic part group 7 are disposed such that the low portion 51 of less lamination layer number of the battery elements 4 faces electronic parts 71 having a high height and the high portion 52 of many lamination layer number of the battery elements 4 faces electronic parts 72 having a low height. Accordingly, the secondary battery 10 and the electronic part group 7 are placed in the external packaging case 8 in a dense state and the dead space of the inside of the external packaging case 8 is kept to a minimum.

Figure 3:
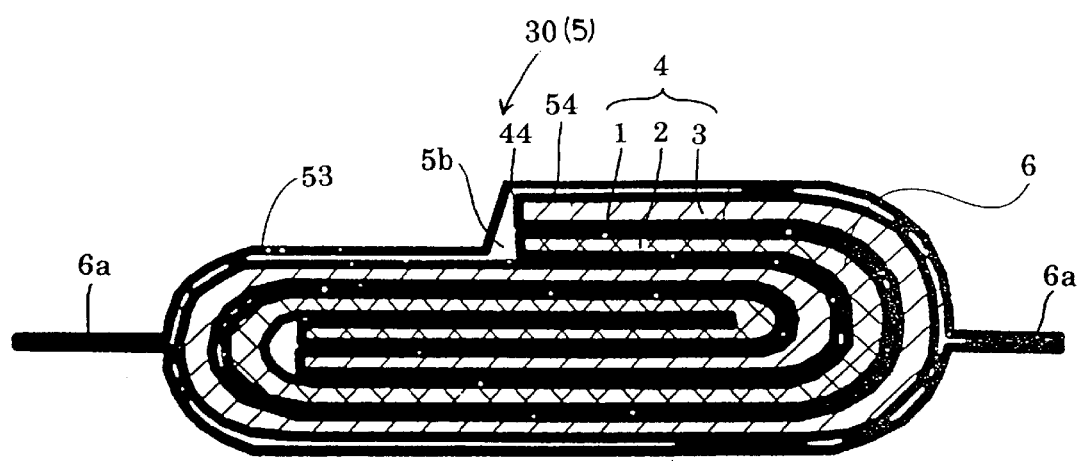
FIG. 3 is a cross sectional view showing other embodiment of the secondary battery of the invention.

In FIG. 3, a secondary battery 30 is provided a battery main body 5 composed of battery elements 4 and an external packaging film 6 sealing the battery element 4 as the case of the secondary battery 10 described above. The battery element 4 is provided an electrolyte 1 and a positive electrode 2 and a negative electrode 3 holding the electrolyte 1 between them.

The secondary battery 30 has a high portion 54 composed of the surface of the end portion 44 of the battery element 4 wound round the surface of the battery element 4, and a low portion 53 composed of the surface exposed at the lower part of the end portion 44, and a difference in level 5b is formed between the high portion 54 and the low portion 53.

The low portion 53 is constituted of the portion having less wound number (lamination layer number [3]) of the battery element 4, and the high portion 54 is constituted of the total lamination layer number [4] of adding an end portion 44 (lamination layer number [1]) laminated by winding on the low portion 53. The external packaging film 6 is adhered to the battery element 4 by vacuum packaging to seal the battery element 4, and a difference in level 5b of the high portion 54 and the low portion 53 is formed on the surface of the external package film 6.

In the secondary battery 30, sealing portions formed by heat-welding each of the both end portions of the external packaging film 6 are bent, and the battery 30 is placed in an external package case 8 together with an electronic part group 7 as shown in FIG. 2 described above as the case of the above-described secondary battery 10.

Figure 4:
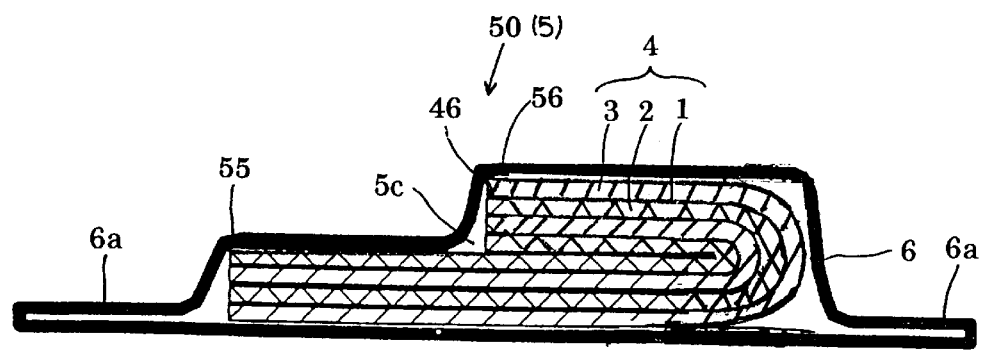
FIG. 4 is a cross sectional view showing still other embodiment of the secondary battery of the invention.

In FIG. 4, a secondary battery 50 is provided a battery main body 5 composed of battery elements 4 and an external packaging film 6 sealing the battery element 4 as the case of the secondary battery 10 described above. The battery element 4 is provided composed of an electrolyte 1 and a positive electrode 2 and a negative electrode 3 holding the electrolyte 1 between them.

The secondary battery 50 has a high portion 56 made of the surface of the end portion 46 of the battery element 4 bent a little on the surface of the negative electrode 3 of the battery element 4 and a low portion 55 made of the surface exposed at the lower part of the end portion 46, and a difference in level 5c is formed between the high portion 56 and the low portion 55.

The low portion 55 is constituted of the portion only (lamination layer number [2]) having no overlapping of the end portion 46 of the battery element 4, and the high portion 54 is constituted of the total lamination layer number [4] of adding the bent end portions 46 (lamination layer number [2]) to the low portion 55.

The external package film 6 is adhered to the battery element 4 by vacuum packaging to seal the battery element 4 and a difference in level 5c of the high portion 56 and the low portion 55 appears as it is on the surface of the external packaging film 6.

In the secondary battery 50, both the ends of the external packaging film 6 are bent as the case of the secondary battery 10 described above, the battery 50 is placed in the external packaging case 8 together with an electronic part group 7 as shown in FIG. 2 described above.

Figure 5:
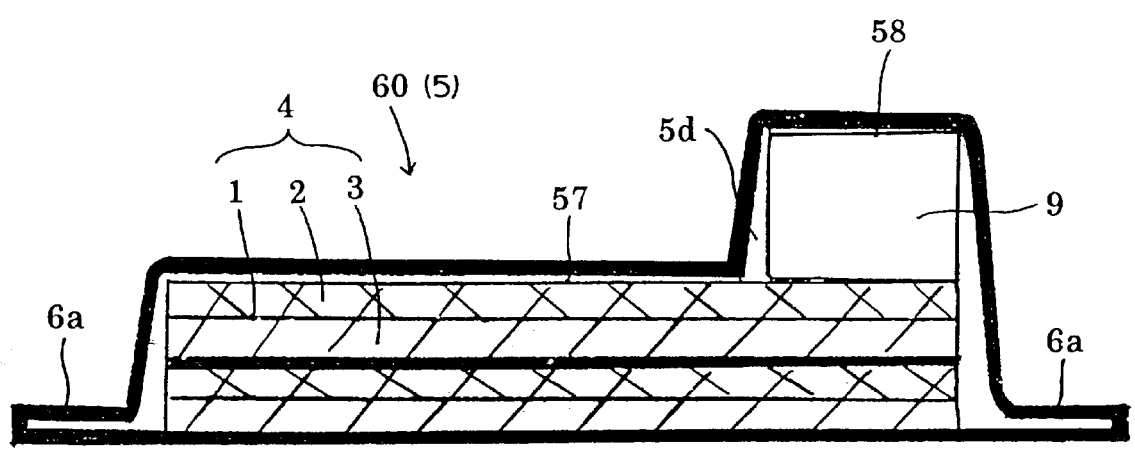
FIG. 5 is a cross sectional view showing another embodiment of the secondary battery of the invention.

In FIG. 5, a secondary battery 60 is provided a battery main body 5 composed of battery elements 4 having an electrolyte 1 and a positive electrode 2 and a negative electrode 3 holding the electrolyte 1 between them, a protective circuit 9 disposed on the surface of the battery element 4, and an external packaging film 6 sealing the battery element 4 and the protective circuit 9 as the case of the secondary battery 10 described above.

The secondary battery 60 has a high portion 58 made of the surface of the protective circuit 9 disposed on the surface of the battery element 4 and a low portion 57 made of the exposed surface of the battery element 4, and a difference in level 5d is formed between the high portion 58 and a low portion 57.

Furthermore, in the secondary battery 60, sealing portions 6a formed by heat-welding each of the end portions of the external packaging film 6 are bent as the case of the secondary battery 10 described above, and the secondary battery 60 is placed in an external packaging case 8 together with an electronic part group 7 as shown in FIG. 2 described above.

Then, the construction of each portion of the lithium secondary batteries 10, 30, and 50 of the present invention is explained.

As the electrolyte 1, there are illustrated an organic electrolytic solution (made of an electrolyte salt and an organic solvent), a solid polymer electrolyte, an inorganic solid electrolyte, a molten salt, etc., and in these electrolytes, a solid polymer electrolyte is particularly preferable.

As the high-molecular solid electrolysis, there are a material constituted of an electrolyte and a high molecule carrying out the dissociation of the electrolyte, a material made of a high molecule having an ion dissociating group, etc. The high molecule carrying out the dissociation of an electrolyte includes a polyethylene oxide derivative or a polymer containing said derivative, a polypropylene oxide derivative or a polymer containing said derivative, a phosphoric acid ester polymer, etc. Also, the gel electrolyte using the high molecule as described above and an organic solvent has both the feature of a solid electrolyte causing no liquid leakage and the ion conductivity close to that of a liquid electrolyte and is very advantageous.

There is no particular restriction on an organic compound which becomes the polymer matrix of the gel solid electrolyte if the compound has an affinity with a solution of an electrolyte and has a polymerizable functional group. The above-described organic compound includes a compound having a polyether structure and an unsaturated double bond group, oligoester acrylate, polyester, polyimine, polythioether, polysulphane, etc. They can be used singly or a combination of two or more kinds thereof. In addition, from the view point of the affinity with a solvent, the compound having a polyether structure and an unsaturated double bond group is preferred. The polyether structure unit includes, for example, ethylene oxide, propylene oxide, butylene oxide, and glycidyl ether. They can be preferably used singly or as a combination of two or more kinds thereof. Also, in the case of using a combination of two or more kinds, the form may be properly selected from block and random. Furthermore, the unsaturated double bond group includes allyl, methallyl, vinyl, acryloyl, methacryloyl, etc.

The gel electrolyte is obtained by dissolving an electrolyte salt in an organic solvent to prepare an electrolytic solution, mixing solution with the above-described organic compound which becomes the skeletal material of the gel solid electrolyte, and polymerizing the mixture.

The organic solvent used for the gel electrolyte includes cyclic carbonates such as propylene carbonate, ethylene carbonate, butylene carbonate, etc.; chain carbonates such as dimethyl carbonate, diethyl carbonate, ethylmethyl carbonate, dipropyl carbonate, etc.; lactones such as γ-butyrolactone, γ-valerolactone, etc.; furans such as tetrahydrofuran, 2-methyltetrahydrofuran, etc.; ethers such as diethyl ether, 1,2-dimethoxyethane, 1,2-diethoxyethane, ethoxymethoxyethane, dioxane, etc.; dimethyl sulfoxide, sulforan, methylsulforan, acetonitrile, methyl formate, methyl acetate, etc.

The electrolyte salt includes lithium salts such as lithium perchlorate ($LiClO_4$), lithium borofluoride ($LiBF_4$), lithium hexafluorophosphate ($LiPF_6$), lithium hexafluoroarsenate ($LiAsF_6$), lithium hexafluoroantimonate ($LiSbF_6$), lithium trifluoromethanesulfonate ($LiCF_3SO_3$), lithium trifluoroacetate ($LiCF_3COO$), lithium halides, lithium chloroaluminate ($LiAlCl_4$), lithium bisfluoromethylsulfonylimid ($LiN(CF_3SO_2)_2$), etc. They can be used singly or as a mixture thereof.

As a polymerization method of the electrolytic solution prepared and the above-described organic compound, there are a thermal polymerization, a photopolymerization, a radiation polymerization, etc. As the thermal polymerization initiator and the photopolymerization initiator, compounds which are known in persons skilled in the art can be used. The amount of the polymerization initiator can be properly selected according to the composition of the polymerizing materials, etc.

In addition, the high-molecular solid electrolyte in the invention is distinguished from electrolytes generally used and includes the above-described gel electrolyte.

Also, an organic electrolytic solution obtained by dissolving the electrolyte in the above-described organic solvent can be used.

Furthermore, in addition to the above-described organic solid electrolytes, inorganic solid electrolytes can be used.

As the inorganic solid electrolyte, there are nitrides of Li, halides, oxyacid salts, etc., and practically, the inorganic solid electrolyte includes $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$, phosphorus sulfide compounds, $Li_2SiS_3$, etc. Also, the inorganic solid electrolyte and organic solid electrolyte described above can be used together.

The positive electrode 2 is formed by mixing a positive electrode active material with an electrically conductive material and a binder.

The positive electrode active material includes lithium-containing oxides such as the oxides shown by $Li_xM1_yM2_{1-y}O_2$ (wherein M1 represents Fe, Co, or Ni; M2 represents a transition metal or a metal belonging to the 4B group or the 5B group; x=0 to 1, and y=0 to 1) typified by LiCoO$_2$ and LiNiO$_2$; LiMn$_2$O$_4$; and the oxides shown by LiMn$_{2-x}$M2$_x$O$_4$ (wherein M2 has the same meaning as described above and x is 0 to 2), etc. When a lithium-containing transition metal chalcogen compound is used, the battery is completed in a discharging state, whereby the use of the compound is preferred in the point of safety in the production process. Also, as the oxides containing no lithium, MnO$_2$, MoO$_3$, V$_2$O$_5$, V$_6$O$_{13}$, etc., can be used but in this case, it is necessary to previously incorporate lithium in the negative electrode 3 or the positive electrode 2, and thus the use of the oxides containing no lithium is undesirable in the point that the production process becomes complicated.

The electrically conductive material includes carbons such as carbon black (acetylene black, thermal black, channel black, etc.), a graphite powder, a metal powder, etc., but the invention is not limited to these materials.

The binder includes fluorine-base polymers such as polytetrafluoroethylene, polyvinylidene fluoride, etc.; polyolefins such as polyethylene, polypropylene, etc.; and synthetic rubbers but the invention is not limited to these materials.

As the mixing ratio of the positive electrode active material, the electrically conductive material, and the binder, it is possible that the conductive material is from 2 to 50 parts by weight, the binder is from 1 to 30 parts by weight to 100 parts by weight of the positive electrode active material.

When the conductive material is less than 2 parts by weight or the binder exceeds 30 parts by weight, the inside resistance or the polarization, etc., of the electrodes becomes large and the discharging capacity of the electrode becomes lower, whereby a lithium secondary battery which can be practically used cannot be prepared. Also, when the conductive material exceeds 50 parts by weight, the amount of the active material contained in the electrode is relatively reduced, whereby the discharging capacity as the positive electrode is lowered.

On the other hand, when the content of the binder is less than 1 part by weight, the binding faculty of the active material is lost, and thus by releasing of the active material and lowering of the mechanical strength of the electrodes, the preparation of the battery becomes difficult. Also, when the content of the binder exceeds 30 parts by weight, the amount of the active material contained in the electrodes is reduced as well as the inside resistance or the polarization, etc., of the electrodes becomes large to lower the discharging capacity as in the case of the conductive material, whereby a lithium secondary battery which can be practically used cannot be prepared.

The preparation of the positive electrode 2 is generally carried out by mixing the active material, the conductive material described above, and the above-described binder dissolved or dispersed in a solvent to prepare a slurry and coating or packing the slurry on or in a current collector. In the preparation of the positive electrode 2, to improve the binding property, it is preferred to carry out a heat treatment at a temperature of about the melting point of each binder and of at least the boiling point of the solvent.

Furthermore, a current collector is added to the positive electrode 2. As a material of the current collector, a metal simple material such as titanium, aluminum, a stainless steel, etc., or an alloy containing these metals, etc., is used. Also, copper, aluminum, or a stainless steel, the surface of which is treated with titanium or silver, or the oxide of each of these metallic materials is used. As the form of the current collector, there are a foil, a film, a sheet, a net, a punched form, a lath, a porous form, a foam, a molding of a fiber group, etc. There is no particular restriction on the thickness of the current collector but from the view points of the strength, the electric conductivity, and the energy density in the case of preparing the battery, the current collector having a thickness of preferably from 1 $\mu$m to 1 mm, and more preferably from 1 $\mu$m to 100 $\mu$m is used.

The negative electrode 3 is formed from a negative electrode active material or a mixture of a negative electrode active material and a binder.

The negative electrode active material includes lithium metal, lithium alloys, and a carbon material or a metal oxide, etc., capable of doping or un-doping lithium. From the points of the safety and the cycle life, the carbon material is preferred. As the carbon material, well-known materials, which have hitherto been used, can be used and examples of the carbon material include natural graphite, petroleum coke, cresol resin-burned carbon, furan resin-burned carbon, polyacrylonitrile-burned carbon, vapor-phase grown carbon, mesophase pitch-burned carbon, and a graphite material obtained by forming an amorphous carbon layer on the surface of graphite having a high crystallimity. In these carbon materials, the use of the graphite material having high crystallimity is preferred since in the case, the voltage of the battery becomes flat and the energy density thereof becomes large. Furthermore, in the graphite materials, the graphite material having an amorphous carbon layer of graphite particles causes less side-reaction with the electrolyte and is particularly preferable in the case of the battery of a form weak to the inside pressure as a secondary battery sealed with a laminated external package.

The negative electrode of the lithium ion secondary battery using the above-described carbon material is formed by mixing the carbon particles and a binder. In this case, to improve the electric conductivity, it is possible to mix an electric conductor.

The binder includes fluorine-base polymers such as polyvinylidene fluoride, polytetrafluoroethylene, etc.; polyolefinss such as polyethylene, polypropylene, etc., synthetic rubbers, etc., but the binder which can be used in the invention is not limited to these materials.

The mixing ratio of the carbon material and the binder is preferably from 99:1 to 70:30 by weight ratio of the carbon material to the binder. When the weight ratio of the binder exceeds 30, the inside resistance or the polarization, etc., of the electrodes becomes large to lower the discharging capacity, whereby the preparation of the lithium secondary battery, which can be practically used, becomes difficult. Also, the weight ratio of the binder becomes less than 1, the binding faculty of the carbon materials each other and the carbon material and the current collector becomes insufficient and by releasing of the active material and lowering of the mechanical strength of the electrodes, the preparation of the lithium secondary battery, which can be practically used, becomes difficult.

The negative electrode 3 is generally prepared by mixing the active material described above, the binder dissolved or dispersed in a solvent, and the electric conductor, which is added according to a necessary, to prepare a slurry, and coating and packing the slurry on or in the current collector. In this case, to increase the binding property and remove the solvent of the binder solution or dispersion, it is preferred to carry out a heat treatment in vacuum, in an inert gas atmosphere, or in air at a temperature of at least the boiling point of the solvent and about the melting point of the binder.

Furthermore, a current collector is added to the negative electrode 3. As the material of the current collector of the negative electrode 3, copper, nickel, etc., is used. As the form of the current collector of the negative electrode 3, there are a foil, a film, a sheet, a net, a punched form, a lath, a porous form, a foam, a molding of a fiber group, etc. There is no particular restriction on the thickness of the current collector but from the view points of the strength, the electric conductivity, and the energy density in the case of preparing the battery, the current collector having a thickness of preferably from 1 $\mu$m to 1 mm, and more preferably from 1 $\mu$m to 100 $\mu$m is used.

There is no particular restriction on the electric conductor and carbons such as carbon black (acetylene black, thermal black, channel black, etc.), etc., metal powders, etc., are used.

The external packaging film 6 is constituted as a laminated external packaging material made of a metal thin film for preventing the entrance of at least water and a heat-welding resin film excellent in the heat-welding property for sealing by heat welding, such as polypropylene, polyethylene, an ionomer resin, etc.

The external packaging film 6 can have a structure of at least 3 layers by further forming, if necessary, a metal foil-protective layer made of a polyester film, etc. It is necessary that a heat-welding resin exists on at least the outermost surface of both surfaces of both the end portions of the external packaging film 6 for applying heat welding.

Also, to increase the heat-welding property of the leading out portion of a metal tab of the electrode, one layer of the denatured resin layer of the above-described heat-welding resin can be formed on the leading out portion of the metal tab.

The thickness of the heat-welding resin film constituting the external packaging film 6 differs according to the kind of the material but is preferably from about 20 $\mu$m to 250 $\mu$m, and from the points of the heat-welding property, the film strength, and the properties of the film, the thickness is more preferably from about 80 to 200 $\mu$m.

As the material of the metal foil forming the metal foil protective layer, there are aluminum, stainless steel, nickel, copper, etc. The thickness of the metal foil is preferably from about 5 $\mu$m to 50 $\mu$m, and more preferably from about 10 $\mu$m to 30 $\mu$m. When the metal foil is too thin, the entrance of water is not sufficiently prevented, and when the metal foil is too thick, at heat welding, heat is not sufficiently transmitted to the resin film, the air tight property is lowered and the external packaging film becomes too thick, whereby the energy density of the battery is lowered.

At each of the sealing portions 6$a$ of both ends of the external packaging film 6 is disposed each of the electrode current collectors (not shown) connected to each of the positive and negative electrodes of the battery element 4.

As the positive electrode current collector, a material capable of enduring a high voltage, such as aluminum, titanium, etc., is preferred, and as the form thereof, there are a foil, a mesh, a punched form, a lath, a porous form, a foam, a molding of a fiber group, etc. The thickness of the positive electrode current collector is from 1 $\mu$m to 1 mm, and from the points of the strength and the energy density, the thickness is preferably from 5 $\mu$m to 100 $\mu$m, and more preferably from 10 $\mu$m to 50 $\mu$m.

As the material of the negative electrode current collector, there are copper, nickel, stainless steel, etc., and the using form and the thickness thereof are same as those of the positive electrode current collector described above.

As the lead portion of taking out an electric current from each current collector, the end portion of each current collector is worked to a desired form, which may be used as it is, or a lead portion may be newly fixed to the current collector. As the terminal fixed to the current collector, a metal foil, a punched form, a lath, etc., described above can be used. In these terminal materials, a punched form and lath are preferred in the point of increasing the air tight property of the sealing portions. As a welding method of the metal tab, a known super sonic welding method, resistance welding method, laser welding method, etc., can be properly used.

Sealing the battery main body with the above-described external packaging film 6 may be carried out under an atmospheric pressure or under a reduced pressure but by sealing under a reduced pressure, the external packaging film can be easily adhered to the battery main body.

When creases are formed at the external packaging film 6 near the difference in level formed between the high portion and the low portion of the battery main body in the invention, a laminated pack of such a shape may be previously used or by properly selecting the form of the level difference, and the form which is hard to be creased can be used. In the case of forming a shape to a laminate pack, there are a method of forming the shape simply mechanically and a method of forming it by heating.

In addition, in a battery main body sealed by a laminated material of an external packaging film 6 as in the invention, a sealed portion of the battery main body as the sealing portion 6$a$, that is, a portion in which a battery essential portion such as a battery element or a protective circuit, etc., is not contained exists, and it sometimes happens that a difference in level forms on the surface of the battery main body by the portion, but the present invention does not include the level difference between the sealed portion and the battery main body portion as described above, and the difference in level formed by only the portion containing the battery essential portion of the battery main body is the difference in level of the invention formed by the high portion and the low portion of the battery main body.

Then, the present invention is practically described by the following examples but the invention is not limited by these examples.

In addition, in the following examples, the measurement of the mean spacing d (002) or the sizes (Lc, La) of the crystallite by an X-ray wide-angle diffraction method was carried out by the method described in "Tanso Zairyo Jikken Gijutsu (Carbon Material Experimental Technique) 1", pages 55 to 63, edited by the Carbon Material Society (published by Kagaku Gijutsu Sha).

Also, as the shape factor K obtaining above-described Lc, La, 0.9 was used. Also, the specific area of particles was measured by a BET method, the particle sizes and the particle size distribution were measured using a laser diffraction type particle size distribution meter, and the peak in the particle size distribution was employed as the mean particle size. In addition, the R value is obtained from two peaks observed by a Raman spectrometric method using an argon laser of 514.5 nm, for example, from the intensity ratio of the peak intensity (I) $1360^{-1}$ near 1360 cm$^{-1}$ and the peak intensity (I) 1580 cm$^{-1}$ near $1580^{-1}$ cm, as R value=1360 cm$^{-1}$/1580 cm$^{-1}$.

EXAMPLE 1

(Production of Secondary Battery of the Embodiment of FIG. 1)

[Preparation of Positive Electrode 2]

As the positive electrode active material, lithium-cobalt oxide ($LiCoO_2$) was used. First, by once dissolving polyvinylidene fluoride as a binder in a solvent, N-methyl-2-pyrrolidone in a mortar, a mixture of the positive electrode active material and acetylene black was dispersed in the above-described solution to prepare a paste. The paste thus prepared was coated on an aluminum foil current collector followed by temporarily drying at 60° C., and after applying a heat treatment at 150° C., the coated layer was pressed. An electrode having a size of 3.5 cm×3 cm (coated portion: 3 cm×3 cm) was formed and an aluminum foil (50 μm) was welded to the uncoated portions. Furthermore, the electrode was dried under a reduced pressure at 180° C. for removing water and was used as a positive electrode for test. In addition, the coated density was 2.9 $g/cm^3$.

[Preparation of Negative Electrode 3]

As a negative electrode active material, artificial graphite, MCMB (particle size 12 μm, d(002)=0.337 nm, R value= 0.4) was used. First, after dissolving polyvinylidene fluoride as a binder in a solvent, N-methyl-2-pyrrolidone in a mortar, the negative active material was dispersed in the solution to prepare a paste, the paste was coated on a copper foil of 20 μm followed by temporarily drying at 60° C., and after applying a heat treatment at 240° C., the coated layer was pressed.

An electrode of a size of 3.5 cm×3 cm (coated portion 3 cm×3 cm) was prepared and a lead of a nickel foil (50 μm) was welded to the uncoated portion. To remove water, the electrode was vacuum dried at 200° C. and was used as a negative electrode. In addition, the coated density was 1.4 $g/cm^3$.

[Preparation of Battery Main Body 5]

After preparing 50 g of a solution of ethylene carbonate (hereinafter, is referred to as EC) and diethyl carbonate (hereinafter, is referred to as DEC) of 1:1 by volume ratio having dissolved therein 1M of $LiPF_6$, 10 g of polyethylene oxide.polypropylene oxide copolymer diacrylate (molecular weight 2000) was dissolved in the solution and then 0.06 g of a polymerization initiator was added thereto to prepare a solution.

A nonwoven fabric (thickness 20 μm) made of polypropylene was impregnated with the solution, the nonwoven cloth was sandwiched between glass plates and gelled by irradiated with ultraviolet rays to obtain a gel electrolyte layer 1.

On the other hand, the positive electrode and the negative electrode described above were impregnated with the above-described solution, sandwiched between glass plates and gelled by irradiating ultraviolet rays to obtain a gel electrolyte composite electrode containing the positive electrode 2 and the negative electrode 3.

By laminating the electrodes 2 and 3 and the electrolyte layer 1 thus obtained, a battery element 4 was prepared. The thickness of one set of the battery element 4 composed of the positive electrode layer 2, the electrolyte layer 1, and the negative electrode layer 3 was 300 μm. Two rectangular pieces of 3 cm×5 cm made of the battery element 4 and two rectangular pieces of 3 cm×2.5 cm made of the battery element 4 were prepared respectively, they were laminated in a same direction to obtain a laminated battery element 4. The battery element 4 was inserted in an external packaging film 6 and sealed while evacuating. The secondary battery 10 was prepared by assuming that the battery was mounted in the external packaging case 8 together with the electronic parts 7 shown in FIG. 2, and the difference in level 5a was 600 μm.

About the secondary battery 10 obtained as described above, a charging discharging test was carried out. As the charging condition, charging was carried out by constant-current constant-voltage charging for 12 hours at a voltage of 4.1 V and an electric current value of 60 mA, and in discharging condition, the electric current value was 60 mA and the final voltage was 2.75 V. As the result of the charging discharging test, the capacity of the secondary battery 10 obtained was 603 mAh.

Comparative Example 1

A secondary battery for comparative test was prepared by laminating two rectangular pieces of 3 cm×5 cm each made of the battery element 4 prepared by the same process as Example 1 such that there was no discrepancy. The secondary battery for comparative test was placed at the thinnest portion between the electronic parts 7 and the external packaging case 8.

As the result of carrying out the same charging discharging test as in Example 1, the battery capacity was 405 mAh.

Comparative Example 2

A secondary battery for comparative test was prepared by laminating four rectangular pieces of 3 cm×2.5 cm each made of the battery element 4 prepared by the same process as Example 1 such that there was no discrepancy. The secondary battery for comparative test was placed at the thickest portion between the electronic parts 7 and the external packaging case 8.

As the result of carrying out the same charging discharging test as in Example 1, the battery capacity was 398 mAh.

As shown by the example and the comparative examples described above, in the case of using the secondary battery 10 of the invention, it becomes possible to mount the battery as a battery effectively utilizing the space of a particularly thin-type electronic instrument as shown in FIG. 2. On the other hand, in the case of using the secondary battery for comparative test having a uniform thickness as prior art, in a particularly thin-type electronic instrument, the inside space is not effectively used and thus a battery having a small capacity cannot but be used. As described above, according to the invention, the inside space of a thin-type electronic instrument can be effectively used, it is possible to mount the battery having such a capacity that has not hitherto been contained in the inside space, and the using time of the electronic instrument can be prolonged.

EXAMPLE 2

One set of battery element 4 was prepared by inserting a separator (made of polypropylene, 25 μm) between the positive electrode 2 and the negative electrode 3. The thickness of the battery element 4 was 350 μm. One rectangular piece of the battery element 4 thus obtained was wound as shown in FIG. 3 and the end portion 44 was overlapped on the surface of the exposed electrode at the lower art of the end portion 44. The battery element 4 composed of the wound assembly obtained was inserted in a laminate pack (external packaging film 6) sealed two edges, and after injecting 1 M $LiPF_6$/EC:DEC as an electrolytic solution, the laminated pack was sealed under a reduced pressure.

On the surface of the secondary battery 30 obtained, the difference in level 5b of 350 μm same as the thickness of one set of the battery element 4 was formed.

As shown in the example, by controlling the length of the rectangular piece of the wound battery element 4 such that the end portion 44 of the wound element is disposed at a desired position, it is clear that the secondary battery having the difference in level at the surface of the battery main body is easily obtained. In addition, in the Example, the end potion 44 was used as it was without adding any working but by further folding the end portion 44, the level difference of the surface of the battery main body 5 can be more largely established without changing the capacity of the battery.

The case of using the secondary battery 30 of the invention for a thin-type electronic instrument was explained above in detail but the use of the secondary battery 30 of the invention is not limited to thin-type electronic instruments but the secondary battery of the invention can be effectively used for other reasons or uses, such as for simply avoiding thermal influences.

Also, the secondary battery of the invention is not only used as the electric source for the electronic instrument which is placed in an external packaging case together with the secondary battery but also used as the electric source for an electronic instrument outside the external packaging case containing the secondary battery.

Now, as described above in detail, since according to the present invention, in the designing stage of an electronic instrument which is constituted together with an electronic part group, an external packaging case, etc., a high portion and a low potion can be desirably established to a battery main body, for example, in the case of placing the secondary battery adjacent to the electronic part group contained in the external packaging case, the secondary battery having a high portion and a low portion capable of absorbing the unevenness of the height of the electronic part group or the secondary battery having a high portion and a low portion fitting to the space of the inside of the above-described external packaging case having a nonuniform shape can be prepared, the secondary battery having a sufficient capacity can be mounted on the electronic instrument while utilizing in maximum the restrained receiving space.

Since when the adhesive packaging technique of prior art, which is used for sealing a battery element by adhering thereto with an external packaging film is applied to the invention, the difference in level according to the high portion and the low portion described above can be formed as it is at the external packaging film of the battery main body, the application of such a technique of prior art does not obstruct the establishment of the correct level difference.

Also, in the present invention, since a secondary battery which can be deformed without adhering to the restriction of a uniform thickness of a secondary battery of prior art can be provided, a secondary battery having a sufficient capacity and capable of attaining small-sizing and thinning of an electronic instrument can be provided without spoiling the degree of freedom of circuit designing.

Furthermore, according to the invention, in the case of circuit designing of the thin-type electronic instrument, the restriction of the disposition of parts can be reduced.

What is claimed is:

1. A secondary battery comprising:
   a battery main body comprising at least first and second different sized battery elements and an external packaging film, each of the first and second battery elements including an electrolyte as well as a positive electrode layer and a negative electrode layer holding the electrolyte therebetween, the external packaging film contacting and sealing the battery elements, and wherein the second battery element has a smaller surface area than does the first battery element,
   wherein the second battery element is stacked on only a portion of the first battery element thereby defining a difference in level comprising first and second different elevations; and
   wherein the external packaging film sealing the battery elements has, at a surface thereof, a contour corresponding to the difference in level.

2. The secondary battery according to claim 1, wherein the difference in level is formed by a plurality of planes perpendicular to a direction in which the electrolyte and the positive and negative electrode layers of the battery elements are laminated.

3. The secondary battery according to claim 1, wherein the external packaging film is adhered to the battery element by vacuum packaging.

4. The secondary battery according to claim 1, wherein the difference in level is from 10 $\mu$m to 2 mm.

5. The secondary battery according to claim 1, wherein the electrolytes comprise solid polymer electrolyte.

6. An electronic instrument comprising the secondary battery claimed in claim 1, an electronic part group including a plurality of different electronic parts, and an external packaging case, wherein high and low portions forming the difference in level of the surface of the external film of the secondary battery are disposed facing the electronic parts having different heights or facing a wall surface having different heights of the external packaging case, whereby the secondary battery and the electronic part group are placed in the external packaging case.

7. The electronic instrument according to claim 6 wherein the secondary battery is a lithium ion battery.

8. The electronic instrument according to claim 6 wherein the electronic instrument is a portable terminal.

9. The electronic instrument according to claim 8 wherein the portable terminal is a portable information instrument comprising one of a portable telephone, a notebook personal computer or an electronic pocketbook, a potable-type game device, a card-type computer and a digital camera.

10. A secondary battery comprising:
    a battery main body comprising first and second different sized battery elements and an external packaging film, each of the first and second battery elements including an electrolyte as well as a positive electrode layer and a negative electrode layer holding the electrolyte therebetween, the external packaging film contacting and sealing the battery elements, and wherein the second battery element has a smaller surface area than does the first battery element,
    wherein the second battery element is laminated and stacked on only a portion of the first battery element thereby defining a difference in level comprising first and second different elevations, so that a part of the battery where the second battery element is stacked on the first battery element has a higher elevation than does a part of the battery where the second battery element is not stacked on the first battery element;
    wherein the second battery element is laminated to only one side of the first battery element; and
    wherein the external packaging film sealing the battery element has, at a surface thereof, a contour corresponding to the difference in level and the first and second different elevations.

11. A secondary battery comprising:
    a battery main body comprising at least one battery element and an external packaging film that encapsulates the at least one battery element, wherein the battery element includes an electrolyte as well as a positive electrode layer and a negative electrode layer sandwiching the electrolyte therebetween;

a protective circuit stacked on only a portion of the battery element thereby defining a difference in level comprising first and second different elevations, so that a part of the battery where the protective circuit is stacked on the battery element has a higher elevation than does a part of the battery where the protective circuit is not stacked on the battery element; and wherein the external packaging film contacts and seals the battery element and the protective circuit, so that an exterior surface of the packaging film has a contour defined at least partially by the first and second different elevations resulting from the protective circuit being stacked on only a portion of the battery element.

* * * * *